United States Patent [19]

Inaba

[11] Patent Number: 5,701,532
[45] Date of Patent: Dec. 23, 1997

[54] LENS ADJUSTMENT DEVICE OF STEREO CAMERA

[76] Inventor: Minoru Inaba, No. 1116, Oaza Samukawa, Oyama-Shi, Tochigi-ken, Japan

[21] Appl. No.: 787,900

[22] Filed: Jan. 23, 1997

[51] Int. Cl.[6] .................................................. G03B 35/10
[52] U.S. Cl. ................................................................ 396/326
[58] Field of Search ............................. 396/324, 326, 396/327, 328, 329; 352/60; 359/462, 473

[56] References Cited

U.S. PATENT DOCUMENTS

| | | | |
|---|---|---|---|
| 1,596,835 | 8/1926 | Hewson | 396/326 |
| 2,063,985 | 12/1936 | Coffey | 396/324 |
| 2,298,586 | 10/1942 | Phillips | 396/327 |
| 2,453,075 | 11/1948 | Land et al. | 396/327 |
| 2,753,774 | 7/1956 | Norling | 396/327 |
| 2,803,179 | 8/1957 | Donaldson | 396/326 |
| 3,115,816 | 12/1963 | Muller | 396/327 |

*Primary Examiner*—A. A. Mathews
*Attorney, Agent, or Firm*—Fattibene and Fattibene; Paul A. Fattibene; Arthur T. Fattibene

[57] ABSTRACT

A lens adjustment device of a stereo camera of this invention operates adjustment rings of right and left lenses of an optical axis distance variable type stereo camera in the interlocking arrangement with each other. Crank arms are provided on stop adjustment rings of lenses mounted on the right and left lens boards capable of adjusting the distance between the optical axes. The right and left crank arms are disposed in symmetry of rotation at 180°. The center of a lever in a vertical direction is fitted to a shaft on a slide frame. The upper end portion of the lever and one of the crank arms are interconnected by a link, while the lower end portion of the lever and the other crank arm are interconnected by another link. When the distance between the optical axes of the right and left lenses is changed by an adjustment mechanism for adjusting the distance between the optical axes, the lever rotates while the stop adjustment rings are kept fixed. When one of the stop adjustment rings is rotated either to the right or the left, the other adjustment ring, too, is rotated in the same direction and at the same angle through the links and the lever, so that stop adjustment of the right and left lenses operates in the interlocking arrangement irrespective of the change of the distance between the optical axes of these lenses.

4 Claims, 12 Drawing Sheets

LENS ADJUSTMENT DEVICE OF STEREO CAMERA

FIELD OF THE INVENTION

This invention relates to a lens adjustment device of a stereo camera. More particularly, this invention relates to a lens adjustment device of a stereo camera equipped with an adjustment mechanism for adjusting the distance between the optical axes of two lens.

In a stereo camera having a pair of right and left lenses mounted to one camera body, the operation factor will be low and an erroneous operation will occur if camera operations such as stop and focus adjustment of the lenses and setting of a shutter speed are carried out individually for each of the right and left lenses. Therefore, the problem of focus adjustment is generally solved by constituting a focus adjustment mechanism which mounts the right and left lenses to a single board and moves back and forth this lens board. In a stereo camera of the type wherein the distance between the optical axes of the right and left lenses is fixed, the camera operation is facilitated by disposing right and left lens stop adjustment rings, and in a lens shutter type stereo camera, the same problem is solved by disposing an interlocking device of right and left shutter speed adjustment rings.

However, the optical axis distance fixed type stereo camera described above is not free from the following problem. In the optical axis distance fixed type stereo camera, parallax of the two imaging lenses increases as an object distance becomes small, and non-overlap imaging areas increase with this increase outside the stereo imaging areas on the right and left imaging screens. Since the non-overlap areas render a serious problem when the resulting photograph is viewed, it is necessary to mount a film to a stereo slide mount having a smaller window width than the actual screen width and to mask the film, so that the loss of the screen due to this masking is extremely great.

An optical axis distance variable type stereo camera capable of changing the distance between the optical axes of the lenses is known, on the other hand, as a stereo camera which solves the screen loss described above. Because the optical axis distance variable type stereo camera can bring the vinsual fields of the right and left lenses at the focusing distance into conformity with each other, this camera can solve the screen loss due to the non-overlap area described above and to obtain an excellent stereo effect. Nonetheless, the optical axis distance variable type stereo camera involves another problem in that it is difficult to dispose an interlocking operation mechanism between the adjustment rings of the right and left lenses.

Figure 10:
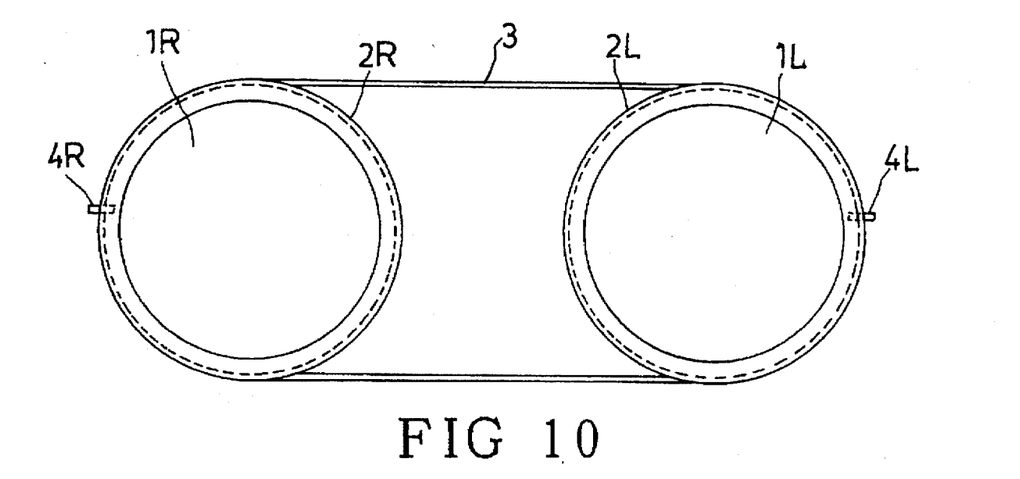
FIGS. 10, 11 and 12 are explanatory views each showing a lens adjustment device according to the prior art.
Figure 11:
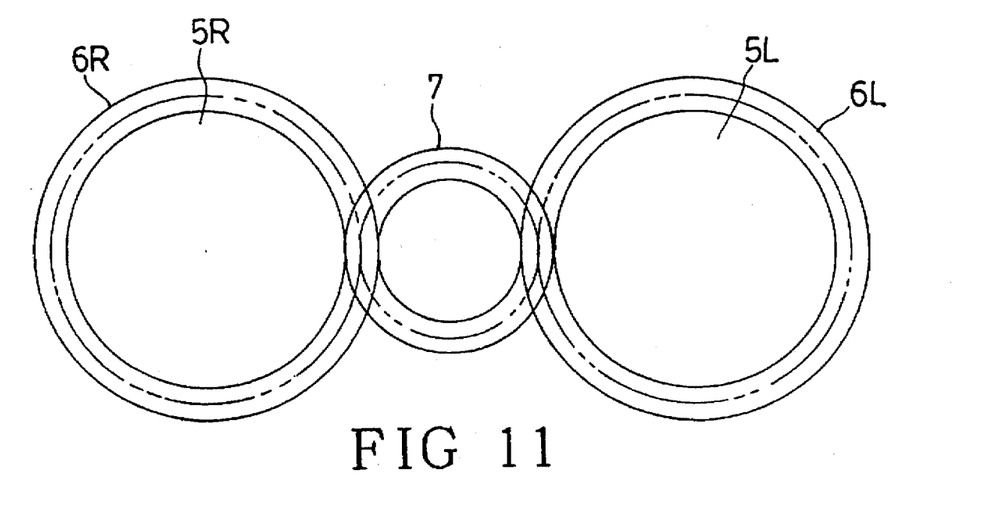
Figure 12:
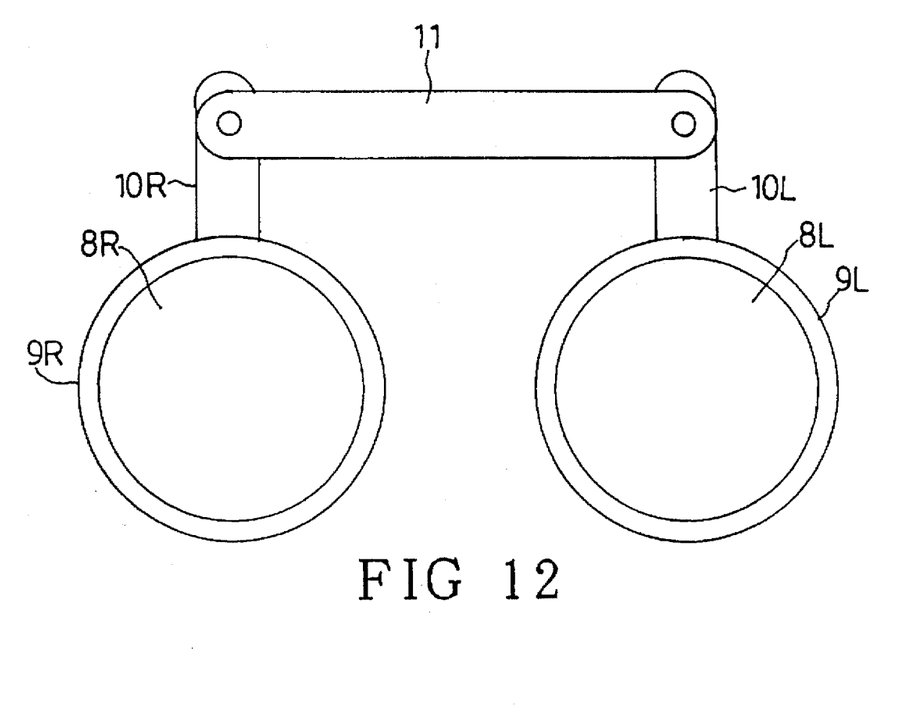

FIGS. 10 to 12 show a lens adjustment device in the optical axis distance variable type stereo camera according to the prior art. In the lens adjustment device shown in FIG. 10, a circumferential groove is formed on the outer peripheral surface of a stop adjustment ring 2R, 2L of each of the right and left stop adjustment lenses 1R and 1L, and one steel belt 3 is wound on the grooves of the ring and left stop adjustment rings 2R and 2L and is fixed to the right and left stop adjustment rings 2R and 2L by pins 4R and 4L, respectively.

In the lens adjustment device shown in FIG. 11, a gear is formed on the outer peripheral surface of the stop adjustment ring 6R, 6L of each of the right and left lenses 5R, 5L, and a counter-gear 7 is interposed between the right and left lenses 5R and 5L so that the right and left stop adjustment rings 6R and 6L operate in the interlocking arrangement with each other.

In the lens adjustment device shown in FIG. 12, equidistant crank arms 10R and 10L are provided at the same position of the stop adjustment rings 9R and 9L of the right and left lenses 8R and 8L, and are interconnected by a link 11.

As can be seen clearly from the drawings, the lens adjustment device shown in FIG. 10 cannot expand the gap between the lenses 1L and 1R. If the lens gap is reduced, the steel belt 3 gets loose and the stop adjustment rings 2L and 2R cannot be operated in the interlocking arrangement. The lens adjustment device shown in FIG. 11 cannot reduce the gap between the lenses 5L and 5R. If the lens gap is expanded, the gears do not mesh with one another, and the intended function cannot be obtained. The lens adjustment device shown in FIG. 12 involves the problem that when the gap between the lenses 8L and 8R is changed, the rotating positions of the right and left stop adjustment rings 9R and 9L undergo mutual displacement, and these stop adjustment rings cannot be held at the same rotating position.

Because the conventional adjustment ring interlocking mechanism cannot be applied to the optical axis distance variable type stereo camera as described above, the right and left lens adjustment rings must be operated individually, and the operation factor of lens adjustment is therefore low.

In this point arises the technical problem which must be solved in order to provide an adjustment ring interlocking mechanism of the lenses applicable to the optical axis distance variable type stereo camera, and to improve the operation factor of the optical axis distance variable type stereo camera, and this is the main object to be solved in the present invention.

SUMMARY OF THE INVENTION

The present invention proposes a novel device for accomplishing the object described above. In other words, in an optical axis distance variable type stereo camera which includes two lens boards mounted on a frame in such a manner as to be slidable to the right and left, and which adjusts either manually or automatically the distance between the optical axes of lenses fitted to the lens boards by disposing a lens gap adjustment mechanism for moving symmetrically the two lens boards in a transverse direction, the present invention provides a lens adjustment device wherein crank arms are provided to adjustment rings of the barrels of right and left lenses, and a lever fitted to the frame and the crank arms of the adjustment rings are interconnected by links, thereby constituting a parallel crank mechanism having symmetry of rotation on the right and left sides with respect to the center of rotation of the lever.

When the distance of the optical axes of the right and left lenses is changed in this lens adjustment device, only the lever rotates but the right and left adjustment rings keep the set positions. When one of the adjustment rings is rotated, the other adjustment ring rotates in the same direction and at the same angle in the interlocking arrangement, and in this way, the right and left adjustment rings can be simultaneously adjusted.

Gears are formed on the right and left adjustment rings, two upper and lower racks are disposed in parallel with the sliding direction of the lenses to the right and left, the upper surface of an intermediate gear fitted to the frame and the upper surface of the gear of one of the adjustment gears are interconnected by the upper rack, and the lower surface of the intermediate gear and the lower surface of the gear of the other adjustment ring are interconnected by the lower rack. The gear constituted in this way in turn constitutes the lens adjustment device of the stereo camera.

This lens adjustment device, too, functions in the same way as the lens adjustment device using the crank mechanism described above, and the right and left adjustment rings operate in the interlocking arrangement irrespective of the distance between the optical axes of the right and left lenses. Accordingly, this lens adjustment device is effective for improving the operation factor and for preventing the erroneous operation.

The above and other objects and features of the present invention will become more apparent from the following description taken in conjunction with the accompanying drawings.

DESCRIPTION OF THE PREFERRED EMBODIMENTS

Figure 1:
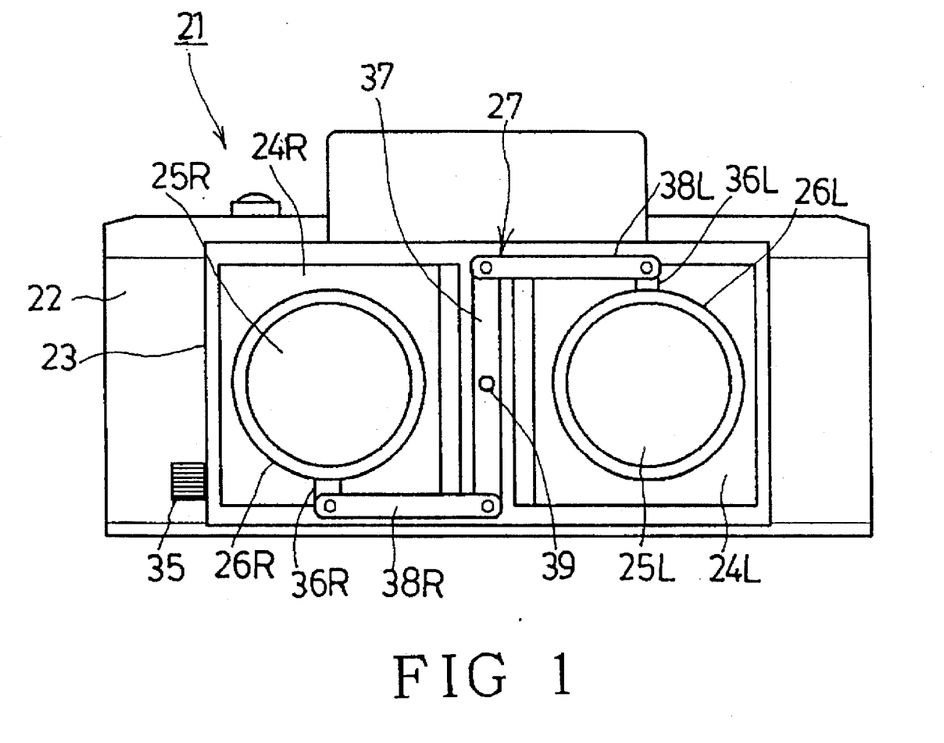
FIG. 1 is a front view of a stereo camera of the type which can change the distance of optical axes.

Hereinafter, preferred embodiments of the present invention will be described in detail with reference to the accompanying drawings. First, an example of the construction of a stereo camera of the type capable of varying the distance between optical axes will be explained. FIG. 1 depicts a stereo camera 21 of the type capable of varying the distance between the optical axes. A slide frame 23 is fitted into a rectangular hole disposed on the front surface of a housing 22 in such a manner as to be capable of sliding back and forth, and a pair of lens boards 24L and 24R are fitted to the front surface of the slide frame 23.

These lens boards 24L and 24R are fitted to slide guides (not shown) disposed in the transverse direction on the slide frame 23, and the gap between the lens boards 24L and 24R is increased or decreased symmetrically to the right and left by a feed mechanism so as to thereby adjust the distance between the optical axes of lenses 25L and 25R. A lens adjustment device 27 for operating stop adjustment rings 26L and 26R of these right and left lenses 25R and 25L in the interlocking arrangement is provided to the slide frame 23.

Figure 2:
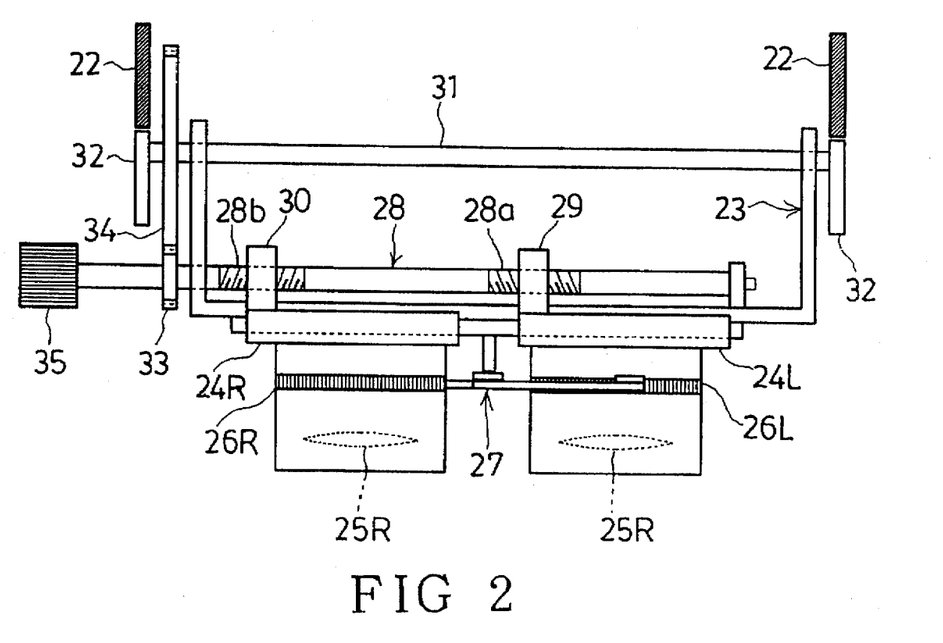
FIG. 2 is an explanatory view of a focus adjustment mechanism of the stereo camera shown in FIG. 1 and its adjustment mechanism for adjusting the distance between optical axes of its lenses.

FIG. 2 shows a focus adjustment mechanism and an adjustment mechanism for the distance between optical axes. A feed screw 28 is fitted in the tranverse direction to the front portion of the slide frame 23. A right screw 28a is formed on the left side (on the right in FIG. 2) of this feed screw 28 and a left screw 28b is formed on the right side. The left screw 28a meshes with a female screw portion 29 of a left lens board 24L and a right screw 28b meshes with a female screw portion 30 of a right lens board 24R so that the gap between the lens boards 24L and 24R can be moved within a predetermined range in a direction in which the center pitch of the right and left lenses 25R and 25L approaches from the position equal to the right and left exposure surface pitch of the film.

A cam shaft 31 is pivotally supported at the back of the slide frame 23, and cams 32 for focus adjustment are fitted to both ends of the cam shaft 31. The slide frame 23 is biased back (upward in FIG. 2) by a spring (not shown), and the cam 32 is brought into pressure contact with a cam contact surface of the housing 22. In consequence, the slide frame 23 slides back and forth in accordance with the revolution of the cam shaft 31.

The feed screw 28 and the cam shaft 31 are interconnected by spur gears 33 and 34. When an adjustment knob 35 fitted to one of the ends of the feed screw 28 is rotated, the lens boards 24L and 24R and the slide frame 23 move in the interlocking arrangement, so that the foci of the lenses 25L and 25R and the distance between their optical axes can be adjusted.

Figure 3:
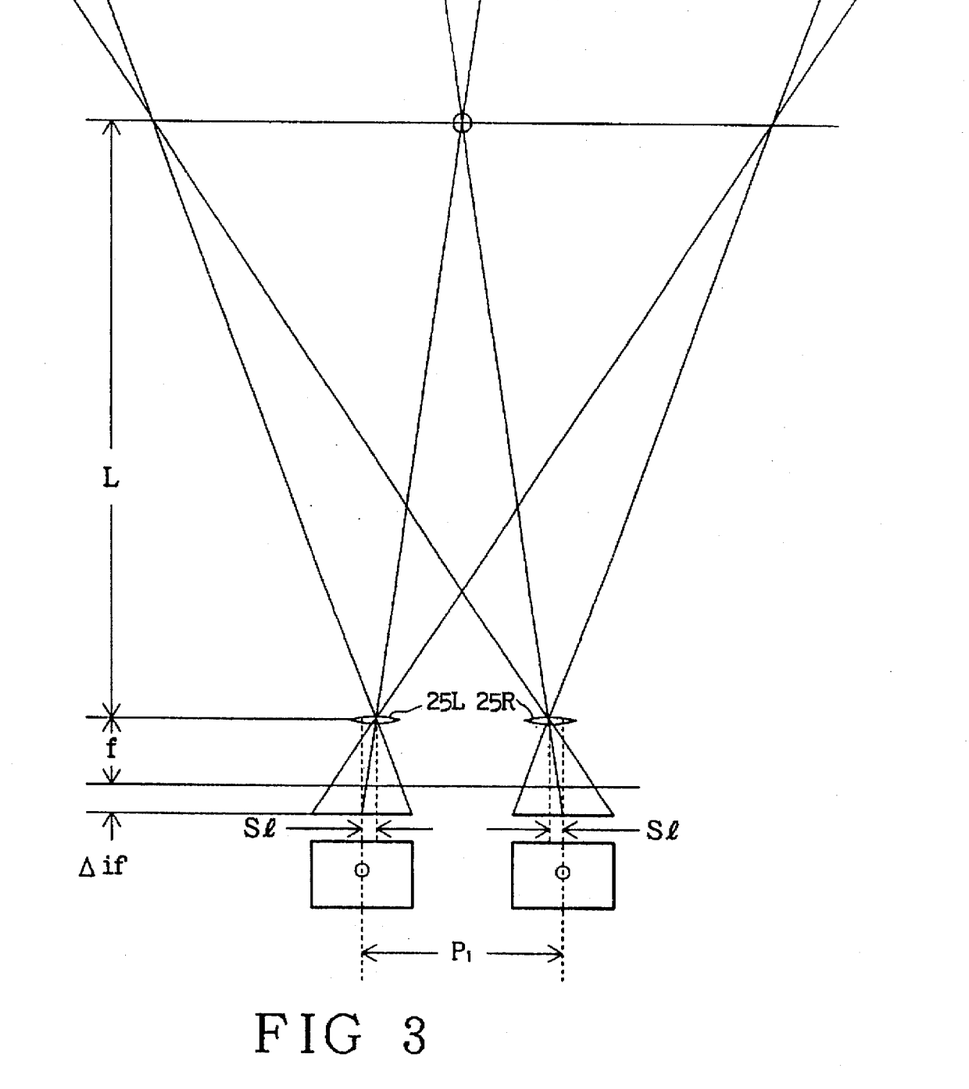
FIG. 3 is an explanatory view showing the relationship between focus adjustment of the stereo camera and the adjustment of the distance between the optical axes of the lenses.

FIG. 3 shows the relation between the foci of the photographing lenses and the distance of their optical axes for bringing the visual fields of the right and left lenses into conformity with each other at the in-focus position. It will be assumed hereby that the lens is a single thin lens and its characteristics are as follows:

focal length: f distance from object to principal point of lens: L distance from focal length of lens to imaging position: $\Delta if$ Then, since $\Delta if = f^2/L - f$, the distance from the principal point of the lens to the film surface is given by $f + \Delta if$.

The shift distance Sl of each of the right and left lenses 25R and 25L for bringing the photographing ranges into conformity on both right and left sides is given as follows:

$$Sl = (P_1/2) \times (f + \Delta if/L + f + \Delta if)$$

where $P_1$ is a pitch of the right and left exposure surfaces of the stereo camera.

Therefore, as the distance L from the object to the principal point of the lens decreases, the right and lenses 25R and 25L may be moved by the shift distance Sl in the approaching direction.

Therefore, if the pitch of the feed screw 28 and the shape of the cam 32 are designed on the basis of the formula described above, the distance between the optical axes of the lenses coincides with the right and left screen pitches at the position at which the foci of the lenses 25R and 25L are at infinite far positions by rotating the adjustment knob 35 disposed on the side surface of the housing 22, and when the slide frame 23 is slid forth, the gap between the right and left lens boards 24R and 24L approaches. Accordingly, the visual fields of the right and left lenses coincide with each other irrespective of the object distance.

Figure 4:
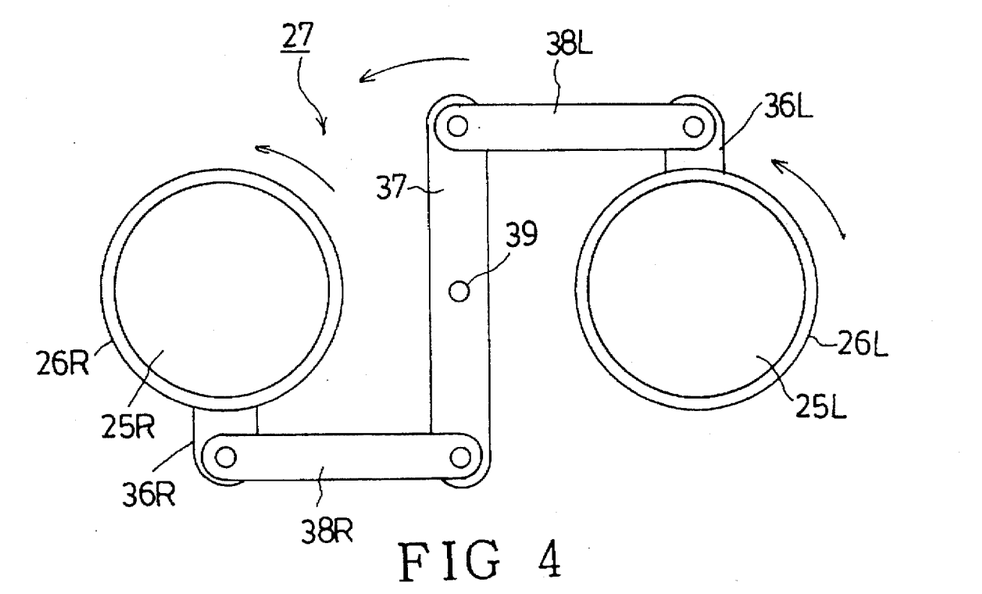
FIG. 4 is an explanatory view of a lens adjustment device set forth in claim 1.

Next, a lens adjustment device will be explained. FIG. 4 shows a lens adjustment device set forth in claim 1. This adjustment device comprises crank arms 36L and 36R in a radial direction which are disposed on stop adjustment rings 26L and 26R equipped with click stops of the right and left lenses 25R and 25L, a lever 37 turnably fitted to the slide frame 23 and positioned at an intermediate position between the right and left lenses 25R and 25L, and links 38R and 38L for interconnecting the lever 37 to the right and left crank arms 36R and 36L, respectively.

The crank arm 36L of the stop adjustment ring 26L on the left (on the right in the drawing) protrudes up and the crank arm 36R of the right stop adjustment ring 26R protrudes down, and they have the relation of symmetry of rotation by 180° on both right and left sides. The middle point of a lever 37 is fitted to a bearing 39 positioned on the line that connects the centers of the right and left lenses of the slide frame 23. The upper end portion of this lever 37 is interconnected by a link 38L to the crank arm 36L of the left stop adjustment ring 26L, and the lower end portion of the lever 37 is similarly interconnected by a link 38R to the crank arm 36R of the right stop adjustment ring 26R. The distances from the centers of rotation of the stop adjustment rings 26L and 26R to the interconnection points between the crank arms 36L, 36R and the links 38L and 38R are the same as the distances from the center of rotation of the lever 37 to the interconnection point between the lever 37 and the links 38L and 38R.

When the distance between the optical axes of the right and left lenses 25R and 25L is changed by the adjustment mechanism for adjusting the distance between the optical axes, only the lever 37 rotates while the right and left stop adjustment rings 26R and 26L remain under the stationary state because the rotating resistance of the lever 37 is by far smaller than the rotary torque of the stop adjustment rings 26L, 26R equipped with the click stop.

When either one of the right and left stop adjustment rings 26R and 26L is rotated to either the right or left, the other stop adjustment ring rotates in the same direction and at the same angle through the link 38R, 38L and the lever 37, and the right and left stop adjustment rings 26R and 26L operate in the interlocking arrangement. In this way, the right and left stop adjustments of the lenses can be operated in the interlocking arrangement irrespective of the change of the distance between the optical axes of the lenses.

Figure 5:
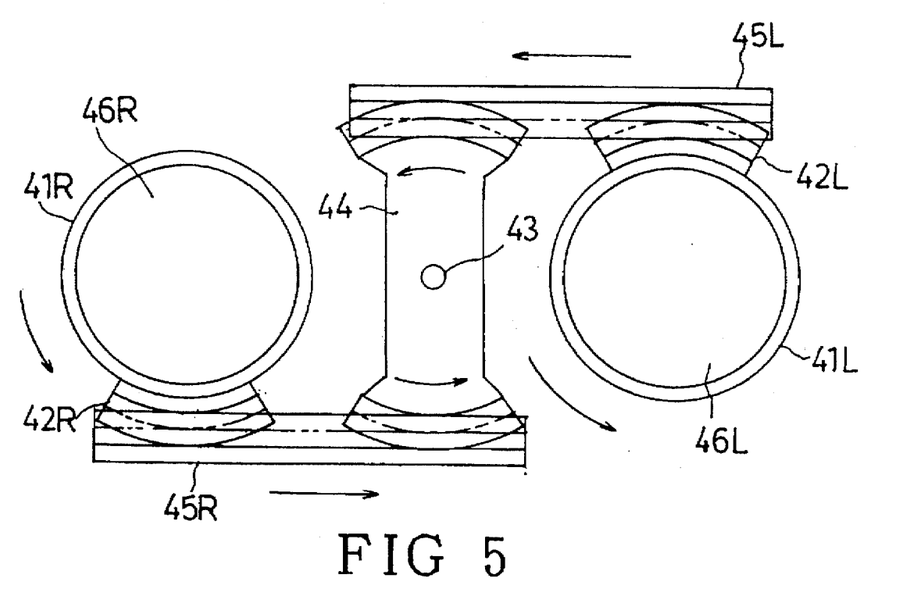
FIG. 5 is an explanatory view of a lens adjustment device set forth in claim 2.

FIG. 5 shows the lens adjustment device set forth in claim 2. Sector gears 42L and 42R are provided to the upper surface of the left stop adjustment ring 41L and to the lower surface of the right stop adjustment ring 41R, respectively, and a sector gear 44 having gears formed at the upper and lower end thereof is fitted to the bearing 43 positioned on the line connecting the centers of the right and left lenses of the slide frame.

The upper gear of the gear 44 at the center and the sector gear 42L of the left stop adjustment ring 41L are interconnected by a rack 45L and the lower gear of the sector gear 44 at the center and the sector gear 42R of the right stop adjustment ring 41R are similarly interconnected by a rack 45R.

When the distance between the optical axes of the right and left lenses 46L and 46L is changed, only the sector gear 44 at the center rotates but the stop adjustment rings 41R and 41L of the right and left lenses do not rotate irrespective of the change of the distance between the lens optical axes, in the same way as the lens adjustment device shown in FIG. 4. When either one of the right and left stop adjustment rings 41R and 41L is rotated to the right or left, the other stop adjustment ring, too, rotates in the same direction and at the same angle through the racks 45L and 45R and the sector gear 44 at the center, so that the right and left stop adjustment rings 41R and 41L operate in the interlocking arrangement.

Figure 6:
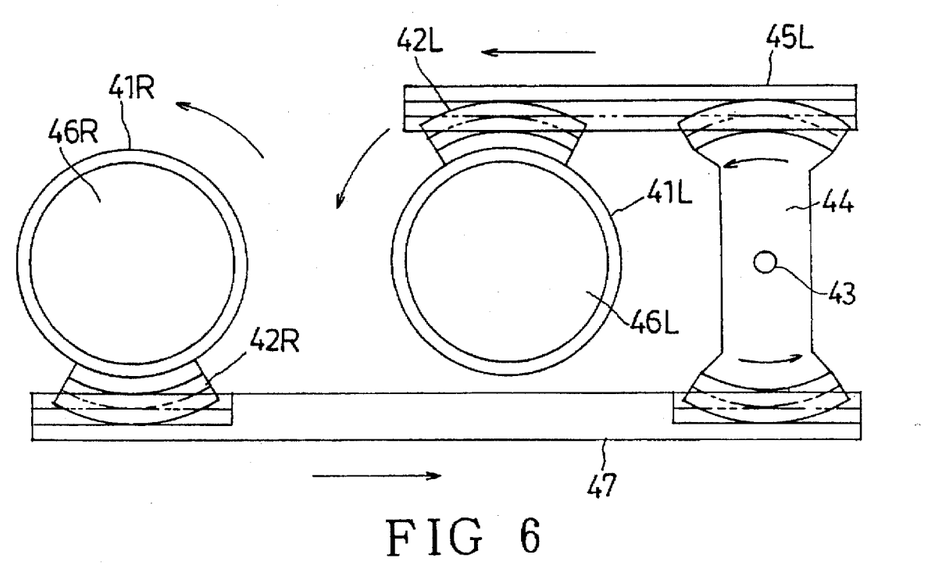
FIG. 6 is an explanatory view showing another form of the lens adjustment device set forth in claim 2.

FIG. 6 shows another form of the lens adjustment device set forth in claim 2. The sector gear 44 disposed at the middle portion between the right and left lenses in FIG. 5 is disposed on the left side of the left lens 46L, and the lower rack 47, which is extended, is meshed with the sector gear 42R on the right adjustment ring 41R. In the case of a stereo camera having a large lens aperture, the space between the lenses is small, and the connecting members such as the lever and the sector gear cannot be disposed easily. Therefore, the lens adjustment device of this embodiment is suitable for such a case.

Figure 7:
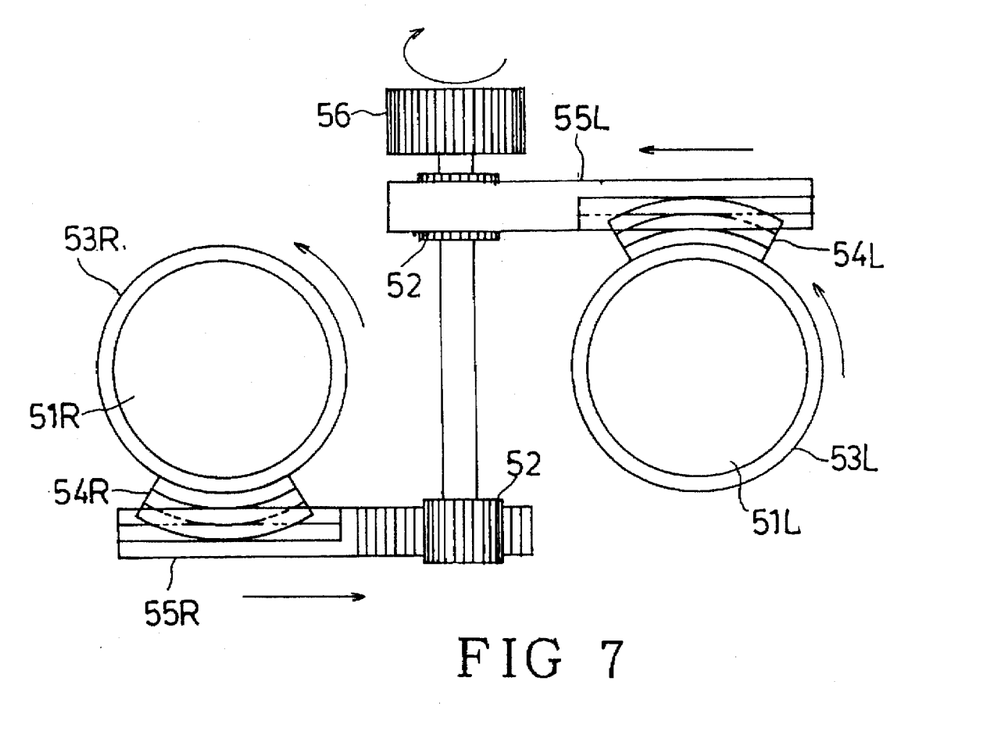
FIG. 7 is an explanatory view of a lens adjustment device set forth in claim 3.

FIG. 7 shows the lens adjustment device set forth in claim 3. A longitudinal pinion 52 is disposed at an intermediate position between the right and left lenses 51R and 51L and is pivotally fitted to the slide frame. Racks are further formed on the back of the upper rack 55L meshing with the sector gear 54L on the upper surface of the left stop adjustment ring 53L and on the front surface of the lower rack 55R meshing with the sector gear 54R on the lower surface of the right stop adjustment ring 53R, respectively, and these racks 55L and 55R on the two surfaces mesh with the front and rear surfaces of the pinion 52, respectively.

When the distance between the optical axes of the lenses 51L and 51R is changed, only the pinion 52 at the center rotates but the right and left stop adjustment rings 53R and 53L do not rotate but keep the set positions, in the same way as in each of the adjustment ring interlocking devices described above. When the knob 56 disposed at the upper end of the pinion 52 is rotated by a finger, both the right and left stop adjustment rings 53R and 53L rotate in the same direction and at the same angle through the pinion 52 and through the racks 55R and 55L.

Figure 8:
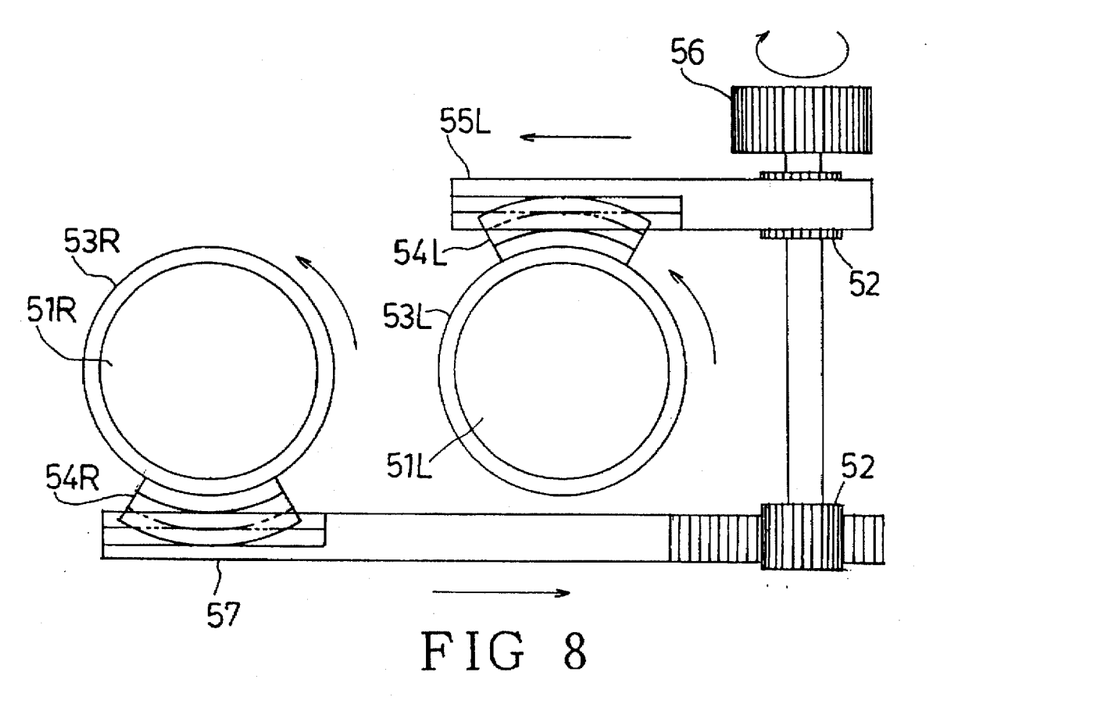
FIG. 8 is an explanatory view showing another form of the lens adjustment device set forth in claim 3.

FIG. 8 shows another form of the lens adjustment device set forth in claim 3. The pinion 52 shown in FIG. 7 is disposed on the left side of the left lens 51L and an extended double-face rack 57 is meshed with the sector gear 54R of the right stop adjustment ring 53. This lens adjustment device is suitable for the case where the space between the lenses is small in the same way as in the adjustment device shown in FIG. 6.

Figure 9:
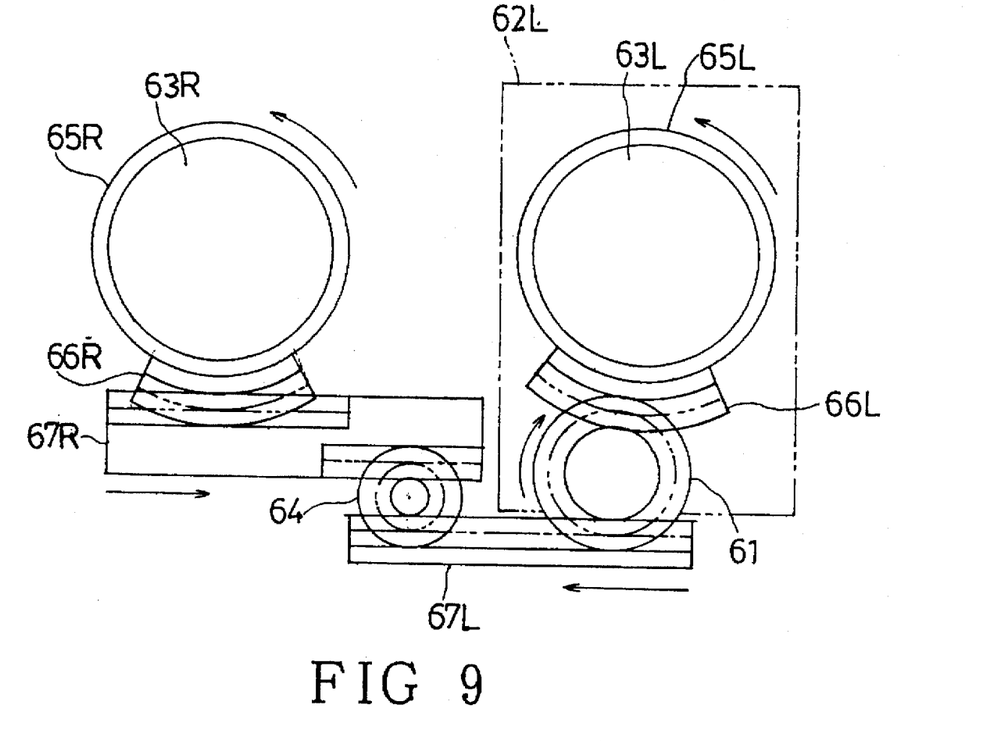
FIG. 9 is an explanatory view showing a lens adjustment device set forth in claim 4.

FIG. 9 shows a lens adjustment device set forth in claim 4, which comprises two pinions and two racks. A first pinion 61 on the left side (on the right side in FIG. 9) is fitted to a left lens board 62L, and a second pinion 64 positioned at the middle point between the right and left lenses 63R and 63R is fitted to the middle portion of a slide frame (not shown) in the transverse direction.

The sector gear 66L of the left stop adjustment ring 65L meshes with the first pinion 61 of the lens board 62L, and the first pinion 61 and the second pinion 64 at the center are interconnected by the lower rack 67L. The sector gear 66R on the lower surface of the right stop adjustment ring 65R is directly interconnected to the second pinion 64 at the center through the upper rack 67R.

In this lens adjustment device, too, the right and left stop adjustment rings 65R and 65L do not rotate irrespective of the change of the distance between the optical axes of the lenses in the same way as in each of the lens adjustment devices described above, and when either one of the right and left stop adjustment rings is rotated, the right and left stop adjustment rings 65R and 65L rotate in the same direction and at the same angle in the interlocking arrangement through the rack and through the two pinions.

As described above, in the stereo camera of the type capable of varying the distance of the optical axes, the lens adjustment device for the stereo camera according to the present invention employs the construction such that when one of the right and left lens adjustment rings is operated, the other adjustment ring operates in the interlocking arrangement, and the right and left adjustment rings are kept at the same position irrespective of the change of the distance between the optical axes. Therefore, the lens adjustment device of the present invention eliminates the troublesome operations of setting the stops, etc, as well as the erroneous operation, speeds up the operation and improves snap-shootability of the stereo camera capable of varying the distance between the optical axes.

Incidentally, the present invention is not particularly limited to the embodiments given above but can be changed or modified in various ways within the scope thereof. Therefore, the present invention naturally embraces such changes or modifications within the scope thereof.

What is claimed is:

1. In an optical axis distance variable type stereo camera which includes two lens boards mounted on a frame in such a manner as to be slidable to the right and left, and which adjusts either manually or automatically the distance between the optical axes of lenses fitted to said lens boards by disposing a lens gap adjustment mechanism for moving symmetrically said two lens boards in a transverse direction, a lens adjustment device for said stereo camera characterized in that a lever is fitted turnably at a middle portion thereof to said frame; a crank arm is provided on an adjustment ring such as a stop disposed on one of right and left lens barrels in such a manner as to exist above a line connecting the center of rotation of said adjustment ring to the center of rotation of said lever; another crank arm is provided on the other of said adjustment rings in such a manner as to exist below a line connecting the center or rotation of said adjustment ring to the center of rotation of said lever; and one of the ends of said lever is interconnected by a link to one of said crank arms while the other end of said lever is interconnected by another link to the other of said crank arms to thereby constitute a parallel crank mechanism so that the other of said adjustment ring rotates in the same direction and at the same angle in the interlocking arrangement with the rotation of one of said adjustment rings.

2. In an optical axis distance variable type stereo camera which includes two lens boards mounted on a frame in such a manner as to be slidable to the right and left, and which adjusts either manually or automatically the distance between the optical axes of lenses fitted to said lens boards by disposing a lens gap adjustment mechanism for moving symmetrically said two lens boards in a transverse direction, a lens adjustment device for said stereo camera characterized in that a gear is formed on the peripheral surface of an adjustment ring such as a stop provided on each of the right and left lens barrels; two racks are disposed above and below two lenses in parallel with the moving direction of said lens boards; said upper rack is meshed with said gear of one of said adjustment rings while said lower rack is engaged with said gear of the other of said adjustment rings; and an intermediate gear meshing with said upper and lower racks is fitted to said frame so that the other of said adjustment rings rotates in the same direction and at the same angle in the interlocking arrangement with the rotation of one of said adjustment rings.

3. A lens adjustment device of a stereo camera according to claim 2, wherein said intermediate gear is a longitudinal shaft gear, two double-face racks are disposed above and below said two lenses in parallel with the moving direction of said lens boards, said gear of one of said adjustment rings and one of the front and back surfaces of said intermediate gear are interconnected by said upper double-face rack, and said gear of the other of said adjustment rings and the other surface of said intermediate gear are interconnected by said lower double-face rack.

4. In an optical axis distance variable type stereo camera which includes two lens boards mounted on a frame in such a manner as to be slidable to the right and left, and which adjusts either manually or automatically the distance between the optical axes of lenses fitted to said lens boards by disposing a lens gap adjustment mechanism for moving symmetrically said two lens boards in a transverse direction, a lens adjustment device for said stereo camera characterized in that a gear is formed on the peripheral surface of an adjustment ring such as a stop provided on each of the right and left lens barrels; a first intermediate gear is disposed on one of said lens boards and is meshed with said gear of said adjustment ring on said lens boards; a second intermediate gear is fitted to said frame; two racks parallel to the moving direction of said lens boards are meshed with upper and lower surfaces of said second intermediate gear; and said first intermediate gear and said second intermediate gear are interconnected by one of said racks while said second intermediate gear and said gear of the other of said adjustment rings are interconnected by the other of said racks so that the other of said adjustment rings rotate in the same direction and at the same angle in the interlocking arrangement with the rotation of one of said adjustment rings.

* * * * *